United States Patent
Kumar (10) Patent No.: US 11,552,572 B2
(45) Date of Patent: Jan. 10, 2023

(54) CRITICAL LOAD MANAGEMENT IN SECONDARY WINDING IN AUXILIARY POWER SUPPLY

(71) Applicant: Hamilton Sundstrand Corporation, Charlotte, NC (US)

(72) Inventor: Dhananjay Kumar, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/999,132

(22) Filed: Aug. 21, 2020

(65) Prior Publication Data

US 2021/0257918 A1   Aug. 19, 2021

(30) Foreign Application Priority Data

Feb. 13, 2020  (IN) .............................. 202011006324

(51) Int. Cl.
*H02M 3/335* (2006.01)
*H02M 1/08* (2006.01)
(Continued)

(52) U.S. Cl.
CPC ......... *H02M 3/33553* (2013.01); *H02M 1/08* (2013.01); *G05F 1/33* (2013.01);
(Continued)

(58) Field of Classification Search
CPC .......... H02M 1/08; H02M 1/36; H02M 3/335; H02M 3/33507; H02M 3/33523;
(Continued)

(56) References Cited

U.S. PATENT DOCUMENTS 4,734,844 A     3/1988  Rhoads
4,811,187 A  *  3/1989  Nakajima ................. G05F 1/38
                                                    363/25
(Continued)

FOREIGN PATENT DOCUMENTS

EP      2001114 B1      5/2011
EP      2683069 A1  *   1/2014  ........ H02M 3/33561
WO      02039567 A2     5/2002

OTHER PUBLICATIONS

European Search Report, dated Jun. 28, 2021, Application No. 21157135.1, Filed: Feb. 15, 2021, 11 pages.
(Continued)

*Primary Examiner* — Yemane Mehari
(74) *Attorney, Agent, or Firm* — Cantor Colburn LLP (57) ABSTRACT

Embodiments include systems for regulating windings in a power supply. Aspects include a transformer comprising a first primary winding and a first secondary winding, a DC to DC converter, a saturable reactor coupled to an output of the first secondary winding and an input to the DC to DC converter, and a controlled current source coupled to a node between the saturable reactor and the input of the DC to DC converter, wherein the controlled current source is configured to provide a current rate based on an output voltage of the DC to DC converter, wherein a first filter inductor of the DC to DC converter is magnetically coupled to a second filter inductor of a second DC to DC converter.

9 Claims, 5 Drawing Sheets

(51) Int. Cl.
*G05F 1/33* (2006.01)
*H02J 7/12* (2006.01)

(52) U.S. Cl.
CPC ............ *H02J 7/12* (2013.01); *H02M 3/33507* (2013.01); *H02M 3/33523* (2013.01); *H02M 3/33569* (2013.01)

(58) Field of Classification Search
CPC ......... H02M 3/33553; H02M 3/33561; H02M 3/33569; H02J 7/12; G05F 1/33
USPC .............. 363/21.04, 21.09–21.11, 90, 91, 93
See application file for complete search history.

(56) References Cited

U.S. PATENT DOCUMENTS

| | | | |
|---|---|---|---|
| 5,132,889 A * | 7/1992 | Hitchcock | ............. H02M 3/337 363/17 |
| 5,479,087 A | 12/1995 | Wright | |
| 5,886,508 A | 3/1999 | Jutras | |
| 6,191,960 B1 | 2/2001 | Fraidlin et al. | |
| 6,501,193 B1 | 12/2002 | Krugly | |
| 6,785,151 B2 | 8/2004 | Ingman et al. | |
| 6,788,554 B2 | 9/2004 | Havanur | |
| 7,675,761 B2 | 3/2010 | Cuadra et al. | |
| 8,232,674 B2 | 7/2012 | Phadke | |
| 8,502,520 B2 | 8/2013 | Chandrasekaran | |
| 8,933,649 B2 | 1/2015 | Matthews et al. | |
| 2002/0131284 A1 | 9/2002 | Jiang et al. | |
| 2006/0170288 A1* | 8/2006 | Usui | ..................... H02M 3/337 307/17 |

OTHER PUBLICATIONS

Levin, "Postregulation Technique Efficiently Supplies Multiple Output Voltages," EDN Electrical Design News, vol. 43, No. 2, Jan. 15, 1998, pp. 133-140.

Pietkiewicz et al., "Redundant DC-DC Switching Power Supply System for Telecommunication Equipment," Proceedings of the International Communications Energy Conference, Oct. 30, 1988, pp. 167-173.

Sebastian et al., "An Alternative Method for Controlling Two-Output DC-to-DC Converters Using Saturable Core Inductor," Proceedings of the Annual Power Electronics Specialists Conference, vol. 1, Jun. 11, 1990, pp. 43-50.

Yang et al., "Stabilizing Magamp Control Loop by Using an Inner-Loop Compensation," IEEE Transactions on Power Electronics, vol. 6, No. 3, Jul. 1991, pp. 419-429.

* cited by examiner

CRITICAL LOAD MANAGEMENT IN SECONDARY WINDING IN AUXILIARY POWER SUPPLY

CROSS-REFERENCE TO RELATED APPLICATIONS

This application claims the benefit of Indian Patent Application number 202011006324 filed Feb. 13, 2020, which is incorporated herein by reference in its entirety.

BACKGROUND

Exemplary embodiments pertain to the art of power converters and more specifically to critical load management in secondary winding in auxiliary power supply.

Switched mode DC to DC converter power supplies are widely used to convert power from a source, such as mains power, to DC power supply for electronic devices. Switched mode DC to DC converters are generally fly back and forward converter topologies. In both instances, the DC to DC converter employs a transformer and a switching device to couple energy to a secondary output. The transformer provides isolation as well as the ability to adjust the output voltage. For multi-output forward converters, often only one output load is regulated while the others are unregulated. Regulating these other output loads typically requires additional large circuitry.

BRIEF DESCRIPTION

Embodiments include a system for regulating windings in a power supply. A non-limiting example of the system includes a transformer comprising a first primary winding and a first secondary winding, a DC to DC converter, a saturable reactor coupled to an output of the first secondary winding and an input to the DC to DC converter, and a controlled current source coupled to a node between the saturable reactor and the input of the DC to DC converter, wherein the controlled current source is configured to provide a current rate based on an output voltage of the DC to DC converter.

Other embodiments include a system for regulating windings in a power supply. A non-limiting example of the system includes a transformer including a set of primary windings comprising a first primary winding, a set of secondary windings comprising a first secondary winding, a second secondary winding, and a third secondary winding, a set of DC to DC converters comprising a first DC to DC converter coupled to the first secondary winding, a second DC to DC converter coupled to the second secondary winding, and a third DC to DC converter coupled to the third secondary winding, a switch configured to operate the first primary winding, a control circuit configured to operate the switch, wherein the control circuit operates the switch based on a first output voltage of the first DC to DC converter, a saturable reactor coupled to a third output of the third secondary winding and an input to the third DC to DC converter, and a controlled current source coupled to a node between the saturable reactor and the input of the third DC to DC converter, wherein the controlled current source is configured to provide a current rate based on a third output voltage of the third DC to DC converter.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Turning now to an overview of technologies that are more specifically relevant to aspects of the disclose, forward converters are DC/DC converters that use a transformer to increase or decrease the output voltage (depending on the transformer ratio) and provide galvanic isolation for a load. With multiple output windings, it is possible to provide both higher and lower voltage outputs simultaneously.

Figure 1:
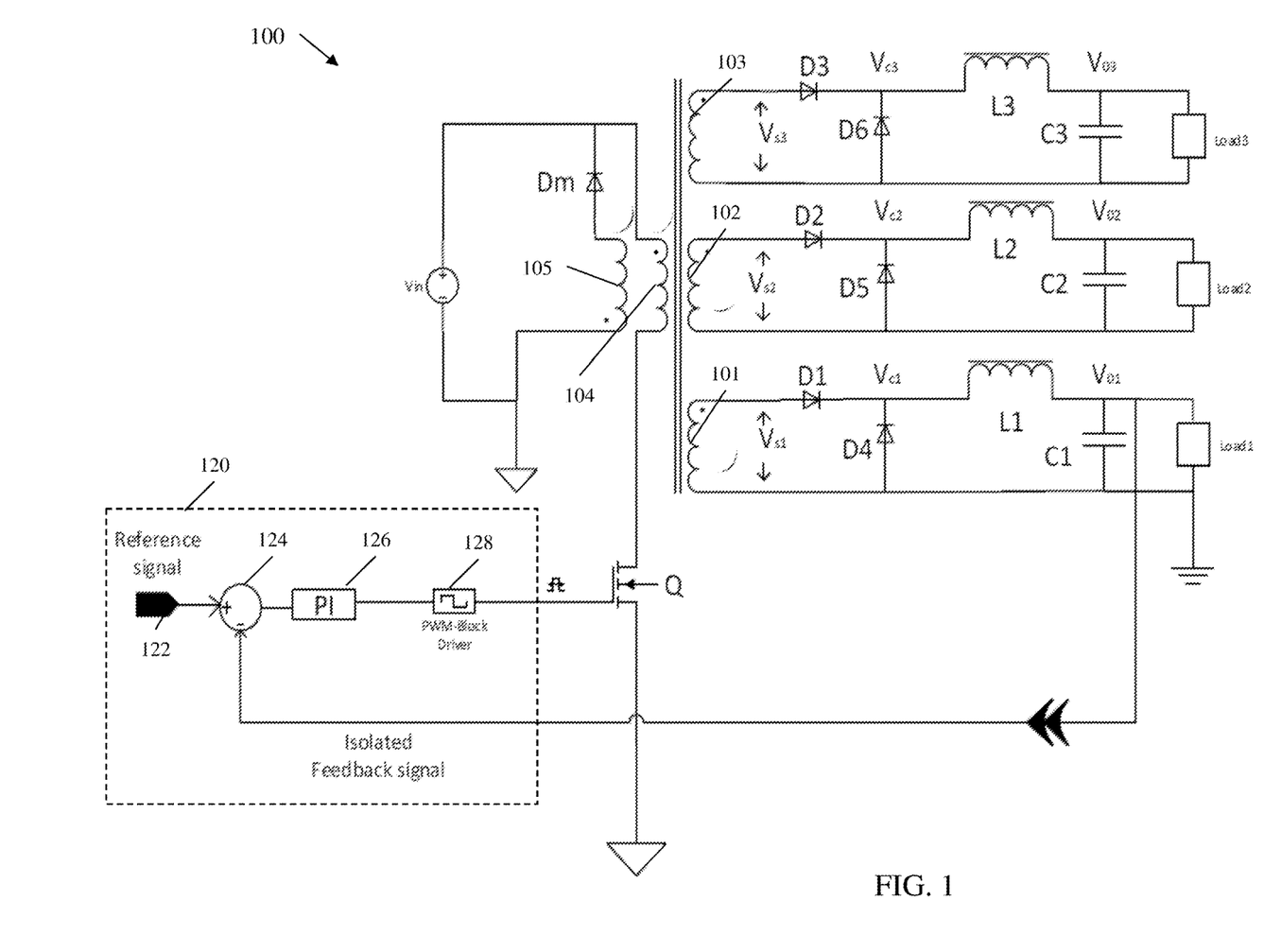
FIG. 1 depicts circuit diagram of a multi-output forward converter according to one or more embodiments.

FIG. 1 depicts circuit diagram of a multi-output forward converter according to one or more embodiments. The forward converter 100 includes a transistor have a set of primary windings and a set of secondary windings. Vin is an external DC power source connected to the primary winding 104 and winding 105 which is the demagnetizing winding parallel to the primary winding 104. The secondary windings include winding 101, winding 102, and winding 103 which are attached to corresponding converter stage circuits. For ease of description, the stages can be referred to as Stage 1, Stage 2, and Stage 3 that correspond to secondary windings 101, 102, and 103. The converter stage circuits are buck converter circuits that drive a load. Herein the loads include Load1 corresponding to Stage 1 and winding 101, Load2 corresponding to Stage 2 and winding 102, and Load3 corresponding to Stage 3 and winding 103.

In one or more embodiments, the Stage 1 converter circuits can referred to as regulated because it is regulating the voltage for load1 utilizing an isolated feedback signal provided to a control circuit 120 that controls the switch Q. The Stage 2 and Stage 3 converter circuits drive unregulated loads Load2 and Load3, respectively. The time that switch Q is turned on versus the total time period can be referred to as a duty cycle. The length of the duty cycle on time, determines the amount of time that each stage capacitor (C1, C2, C3) is charged up by the source voltages ($V_{s1}$, $V_{s2}$, $V_{s3}$) for each stage converter circuit. While switch Q is on, the output voltages ($V_{O1}$, $V_{O2}$, $V_{O3}$) are equal to the source voltages ($V_{s1}$, $V_{s2}$, $V_{s3}$). When switch Q is off, the capacitors (C1, C2, C3) drive the corresponding loads. The duty cycle, when regulated, can be adjusted by the control circuit 120 which adjust the time for when switch Q is on versus being off. The control circuit 120 includes a reference signal 122, a voltage comparator 124, a PI controller 126, and a pulse width modulation (PWM) driver 128. The output of the control circuit 120 operates the switch Q. When switch Q is on (i.e., closed), the primary winding 104 is energized and provides a voltage to the secondary windings 101, 102, and 103 which correspond to source voltages $V_{s1}$, $V_{s2}$, and $V_{s3}$, respectively. The feedback signal provides the voltage $V_{O1}$ driving Load1 in the Stage1 converter. The reference signal 122 can be set to ensure that the required output voltage $V_{O1}$ is provided during the discharge of the capacitor C1. As mentioned above, the charging of C1 occurs while switch Q is turned on and the primary winding 104 is energizing secondary winding 101. However, capacitor C1 can be overcharged or undercharged which results in the output voltage $V_{O1}$ being either above or below the required voltage for Load1. The control circuit 120 adjusts the duty cycle for operation of switch Q to adjust for any overcharging or undercharging so that the output voltage $V_{O1}$ will be the correct voltage for Load1.

In one or more embodiments, the control circuit 120 operates by receiving as input the output voltage $V_{O1}$ from the Stage1 converter circuit. The PWM block driver 128 provides a set duty cycle for operation of switch Q. However, when $V_{O1}$ drops below or goes above the desired output voltage, the feedback signal with the value for $V_{O1}$ will be compared to the reference signal 122 using the voltage comparator 124. The voltage comparator 124 will output an error signal to the PI controller 126. Based on this error signal, the PI controller 126 can adjust the duty cycle in the PWM block driver 128 to account for the error in output voltage $V_{O1}$. This can be repeated until the duty cycle is adjusted so that the $V_{O1}$ is the correct voltage for Load1. For example, presume Load1 requires a regulated voltage of 5V. If $V_{O1}>5V$, the duty cycle will be decreased because the capacitor C1 is being charged too high. If $V_{O1}<5V$, the duty cycle will be increased because the capacitor C1 is not being charged high enough. This is repeated until $V_{O1}=5V$.

Figure 2:
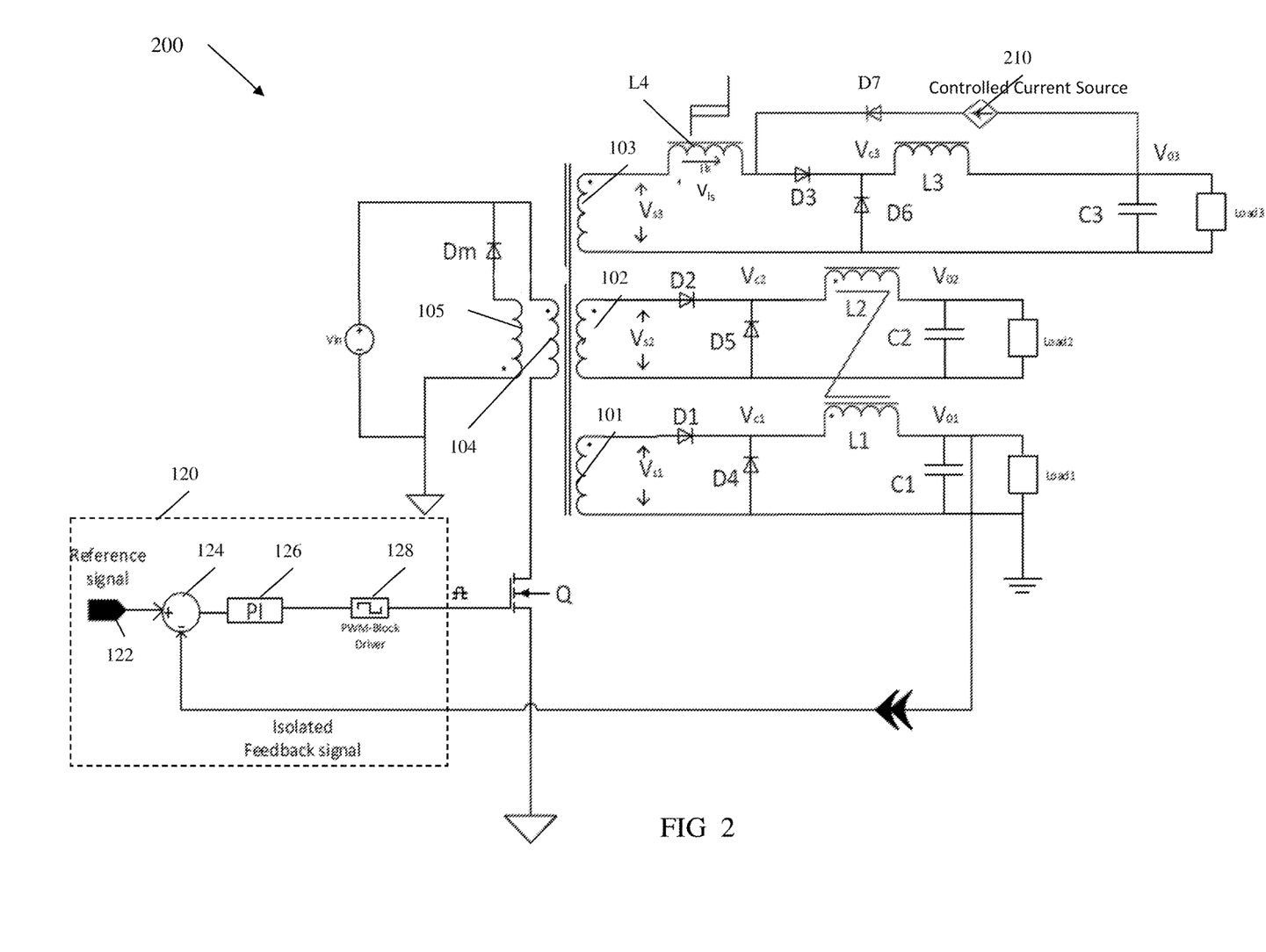
FIG. 2 depicts circuit diagram of a multi-output forward converter with regulated windings for critical loads according to one or more embodiments.

In one or more embodiments, based on the adjustments to the duty cycle of switch Q, the output voltages $V_{O2}$, $V_{O3}$ of Stage2 and Stage3 can be affected. This effect can become problematic especially if there is a higher mismatch of delivered power in regulated Stage1 requiring a more drastic change to the duty cycle operating switch Q. FIG. 2 depicts circuit diagram of a multi-output forward converter according to one or more embodiments. Similarly to FIG. 1, the forward converter 200 includes components from FIG. 1 circuit 100 and for ease of illustration the same numbering scheme shall be used to refer to each component between the two figures. In one or more embodiments, the forward converter 200 includes a local regulation circuit for regulating Load3. Additionally, since Load1 is regulated by the control circuit 120, Load2 shall be regulated through magnetic coupling inductor L2 with L1, where inductor L1 is included in the regulated Stage1 converter.

In one or more embodiments, the forward converter 200 includes a regulation circuit for the Stage3 converter that includes a controlled current source 210, diode D7, and a saturable inductor L4. The saturable inductor L4 (sometimes referred to as a "saturable reactor") is a special form of inductor where the magnetic core can be deliberately saturated by a direct electric current in a control winding. Once saturated, the inductance of the saturable inductor drops dramatically which allows the saturable inductor to mimic properties of a switch.

If a constant voltage $V_L$ is applied across the inductor L4, the current $i_L$ shall linearly increase according to equation (1) until it reaches a saturation limit $i_{Ls}$, where L is the inductance and t is time.

$$i_L = \frac{1}{L}\int V_L dt \tag{1}$$

Despite maintaining a voltage from an external source across the inductor L4, the voltage across the inductor $V_L$ is not constant. The saturable inductor L4 will eventually have the voltage $V_L$ across fall to zero due to a zero flux change in the core illustrated by equation (2), where $i_L$ is the current in the inductor, N is the number of turns of the inductor on core. $d\varnothing/dt$ represents the change in flux within the core that is responsible for maintaining the voltage across the inductor according to equation (2).

$$V_L = N\frac{d\phi}{dt} = 0 \tag{2}$$

If external circuits are not able to limit the current across this inductor L4, then current shall rise steeply though the inductor L4. Current $i_L$ that is above $i_{Ls}$ shall see no impedance meaning the inductor L4 will act as a wire (i.e., closed switch). Thus, the saturable inductor L4 can be utilize to provide impedance for a period of time and then, once saturated, will not provide impedance. This saturable inductor L4 acts as a magnetic amplifier to provide voltage modulation with an on/off capabilities and can be utilize to regulate the voltage $V_{O3}$ across Load3.

The stage 3 converter circuit include the saturable inductor L4 in the path ahead of winding 103. The controlled current source 210 fed from the output voltage $V_{O3}$ along with diode D7 in series is feeding a buck converter configuration. Operational mode of the switch Q and accompanying description of Stage 3 converter and saturable inductor L4 will now be described with reference to the forward converter 200 in FIG. 2 and the timing diagram 300 in FIG. 3. When switch Q is on, the dot end of winding 103 will become positive and voltage $V_{s3}$ starts driving the current through inductor L4. At this point, the inductor L4 is in the unsaturation region and offers impedance to the source voltage $V_{s3}$ and voltage Vis becomes equal to $V_{s3}$. Inductor L3 which is load current shall freewheel through diode D6 and $V_{s3}$ shall remain disconnected from the load. However, as the inductor L4 current $i_L$ increases toward $i_{Ls}$, the load current supplied by freewheeling diode D6 keeps decreasing. As $i_L$ increases linearly towards the saturation current $i_{Ls}$, the flux change across the inductor becomes zero and the voltage $V_L$ across inductor L4 drops to zero. At this time, freewheeling diode D6 enters into reverse blocking region as the source voltage $V_{s3}$ directly appears across it in the reverse blocking direction. At this time, source voltage $V_{s3}$ shall supply full Load3 current. That is to say, the load current for Load3 is not supplied by the secondary source voltage $V_{s3}$ instantaneously, but it takes a finite time duration for the saturable inductor L4 to saturate to its saturation current $i_{Ls}$.

Figure 3:
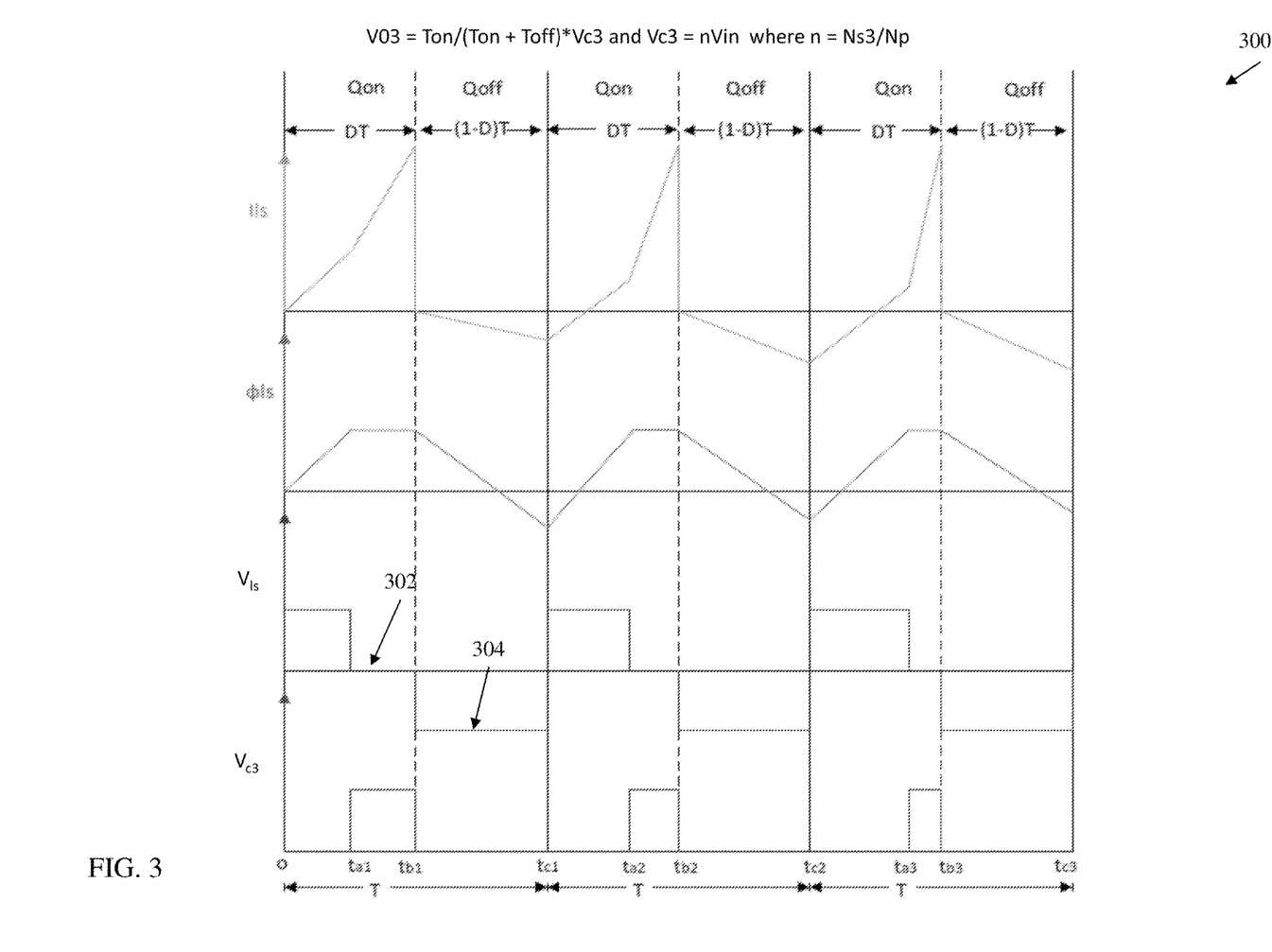
FIG. 3 depicts a timing diagram of four waveforms according to one or more embodiments.

In one or more embodiments, when switch Q turns off, winding 103 dot and non-dot end become negative and positive, respectively. Diode D6 is in the forward direction and freewheeling the Load3 current. The controlled current source 210 is attached to $V_{O3}$ and the midpoint of inductor L4 and diode D3 connection. DC current from the controlled current source 210 does not flow through D3 as it is in a reverse bias condition. The remaining path of this current flow is through inductor L4. As described earlier, when switch Q is turned on, flux through the inductor L4 has reached to $\Phi_{sat}$ and this reverse current brings the flux into the reverse direction. FIG. 3 depicts a timing diagram showing the duty cycle of switch Q and accompanying current, flux, and voltage values according to one or more embodiments. As shown in the timing diagram 300, as current goes in the negative direction and the inductor L4 is desaturated, it will take a longer time to reach $i_{Ls}$ again in the next turn on cycle than in the initial turn on cycle. This is depicted with current $i_{Ls}$ for inductor L4, wherein the current goes negative and takes a longer time to reach saturation. In the next turn on cycle, the current $i_L$ will take even longer to reach saturation. This causes a delay from saturation occurs in the inductor L4 and thus delays the time to stop freewheeling action of diode D6 and to transfer $V_{s3}$ to $V_{c3}$. Based on this property, the output voltage $V_{O3}$ can be controlled independently of any duty cycle changes to switch Q.

In one or more embodiments, the timing diagram 300 includes four waveforms labeled as $i_L s$, $\Theta_{Ls}$, $V_L s$, and $V_{c3}$, where $V_{c3}$ is the control voltage on the load in the buck converter topology. The timing diagram 300 is divided by time into Qon and Qoff with DT and (1-D)T period three switching cycle. During the tun on duty cycle DT of Q, current increases in inductor current $i_L$ with the slop rate of $V_{Ls}/L4$. The flux $\Theta_{Ls}$ in the inductor L4 shall also follow the same pattern of increase with a different clop of $V_{Ls}/N_{s3}$, where $N_{s3}$ is the number of turns in winding 103. The two slops are constant values as $V_{Ls}$, L4, and $N_{s3}$ are also constant values. Once the inductor current $i_L$ reaches to its saturation current limit, the flux in the core also reaches to a saturation flux value and voltage across the inductor $V_{Ls}$ falls down to zero, as shown at 302. The winding voltage $V_{s3}$ reaches to the cathode of diode D6 and makes it reverse biased. The full load current combines with the full current now flowing through the saturated inductor L4. The last waveform in series between time points 0 to $t_{a1}$ and $t_{a1}$ to $t_{b1}$ are freewheeling and power transfer, respectively. When Q turns off during (1-D)T, the polarity inversion takes place across the secondary winding 103. The current flowing through inductor L4 shall drop down to zero and start building in the negative direction as per current control from the controlled current source 210. Similarly, the flux $\Theta_{Ls}$ shall also be brought down in the inductor L4. Since the current and flux slopes are negative, the voltage across the inductor L4 will be negative, as shown at 304. If the current provided from the controlled current source 210 is controlled such that the voltage across the inductor L4 is less than the voltage $V_{O3}$ of the secondary winding 103 during this period, diode D3 will be in reverse bias a voltage value being $V_{s3}-V_{O3}$ and inductor L4 will not saturate in the negative direction.

In the next switching cycle, the current $i_{Ls}$ and flux $\Theta_{Ls}$ start increasing with the same slope rate as the initial switching cycle. However, this time, the start point of the waveforms are different than the zero value as caused by the controlled current source 210. The timing diagram 300 shows the values as being less than zero; however, these values can be greater than zero based on operation of the controlled current source 210 as described in greater detail below. Thus, either sooner or later than the initial switching cycle, the inductor L4 will be brought to saturation for current and flux bringing the voltage across the inductor L4 to zero. This time the voltage duration of $V_{Ls}$ across the inductor L4 will be larger than the previous cycle during Qon. Consequently, the $V_3$ positive pulse duration between $t_{b2}-t_{a2}$ will be a smaller duration than the pulse duration of $t_{b1}-t_{a1}$. This function repeats in the next switching cycle.

By controlling the current supplied by the controlled current source 210 based on the value of Load3 voltage $V_{O3}$, the flux desaturation in the core of the saturable inductor L4 can be increased, decreased, or remain constant. That is to say, the higher the desaturating point of flux during the Qoff period shall cause a larger pulse period of $V_{Ls}$ across inductor L4 during the next Qon period. The larger pulse period of $V_{Ls}$ allows the $V_{c3}$ pulse period to be a smaller duration during the Qon time period. This illustrates the pulse duration across diode D6 could be modulated as per the Load3 voltage V03 with a rate of current controlled source 210 independent of the switch Q on/off period. The average voltage across diode D6 can appear across Load3. This is given by the following equation: $V_{O3}=Ton/(Ton+Toff)*V_{c3}$ and $V_{c3}=n*Vin$, where $n=N_{s3}/Np$ and n is the turns ratio of winding 103 and winding 104.

Figure 4:
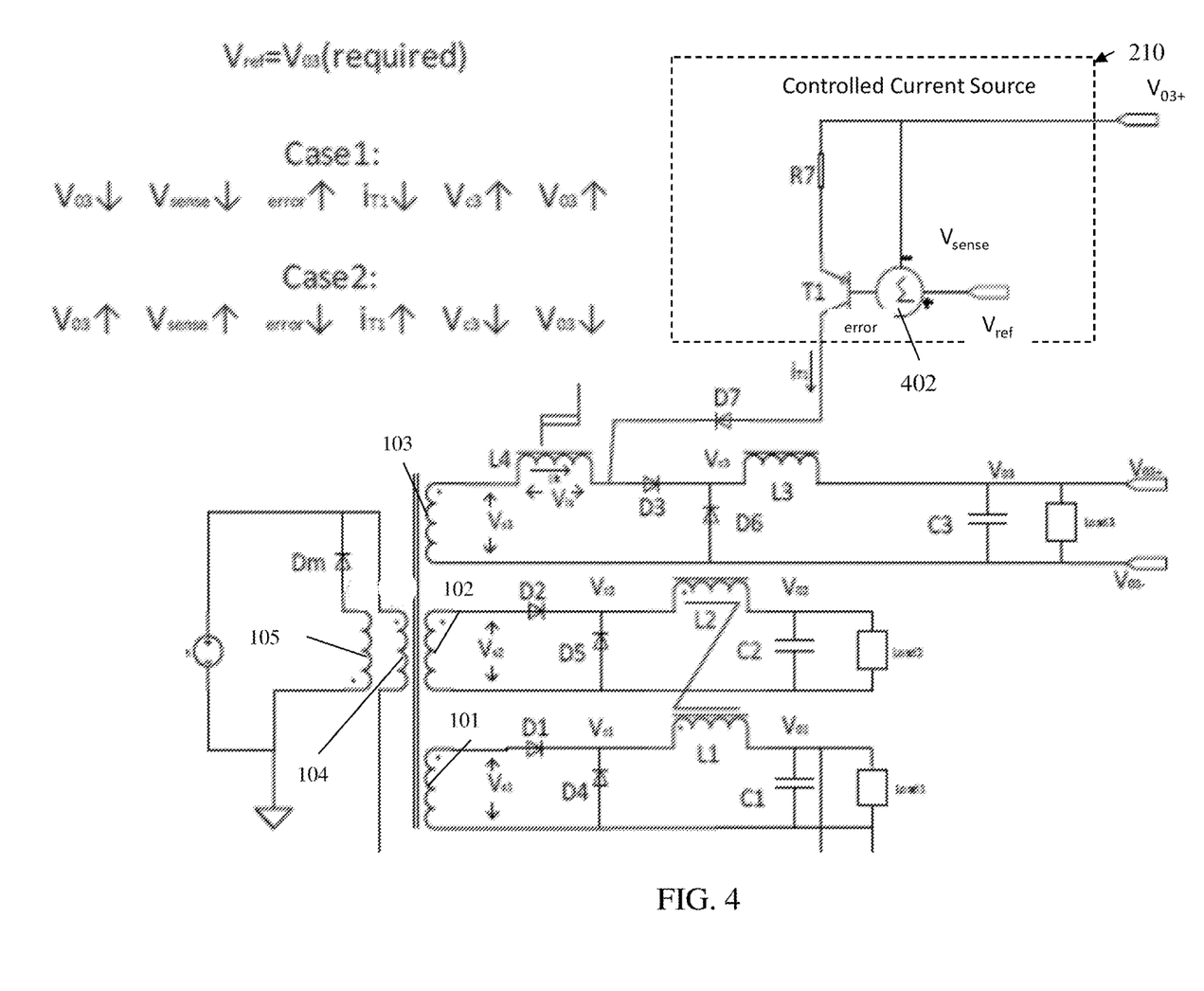
FIG. 4 depicts a circuit diagram of a control circuit for the controlled current source according to one or more embodiments.

FIG. 4 depicts a circuit diagram of a control circuit for the controlled current source 210 according to one or more embodiments. The controlled current source 210 includes an error amplifier circuit 402 and a PNP transistor T1. The PNP transistor T1 works in the linear region at different points of its load line according to its gate drive. The base current can bias the transistor T1 at an appropriate point such that a correct amount of current should flow through the emitter collector to desaturate the inductor L4. As the Load3 voltage $V_{O3}$ decrease, Vsense decreases, error increases (as output from the error amplifier circuit 402) and transistor T1 is biased towards the cut off region and $i_{T1}$ decreases. Hence, flux in the core desaturates more towards the zero flux point (i.e., origin) than in a previous cycle and thus $V_{c3}$ increases causing the average value of Load3 voltage V03 to increase. The reverse sequence happens when the V03 increases and the output of the error amplifier circuit 402 decreases. R7 is used for the biasing the PNP transistor T1 and Diode D7 allow the current to flow in one direction.

Figure 5:
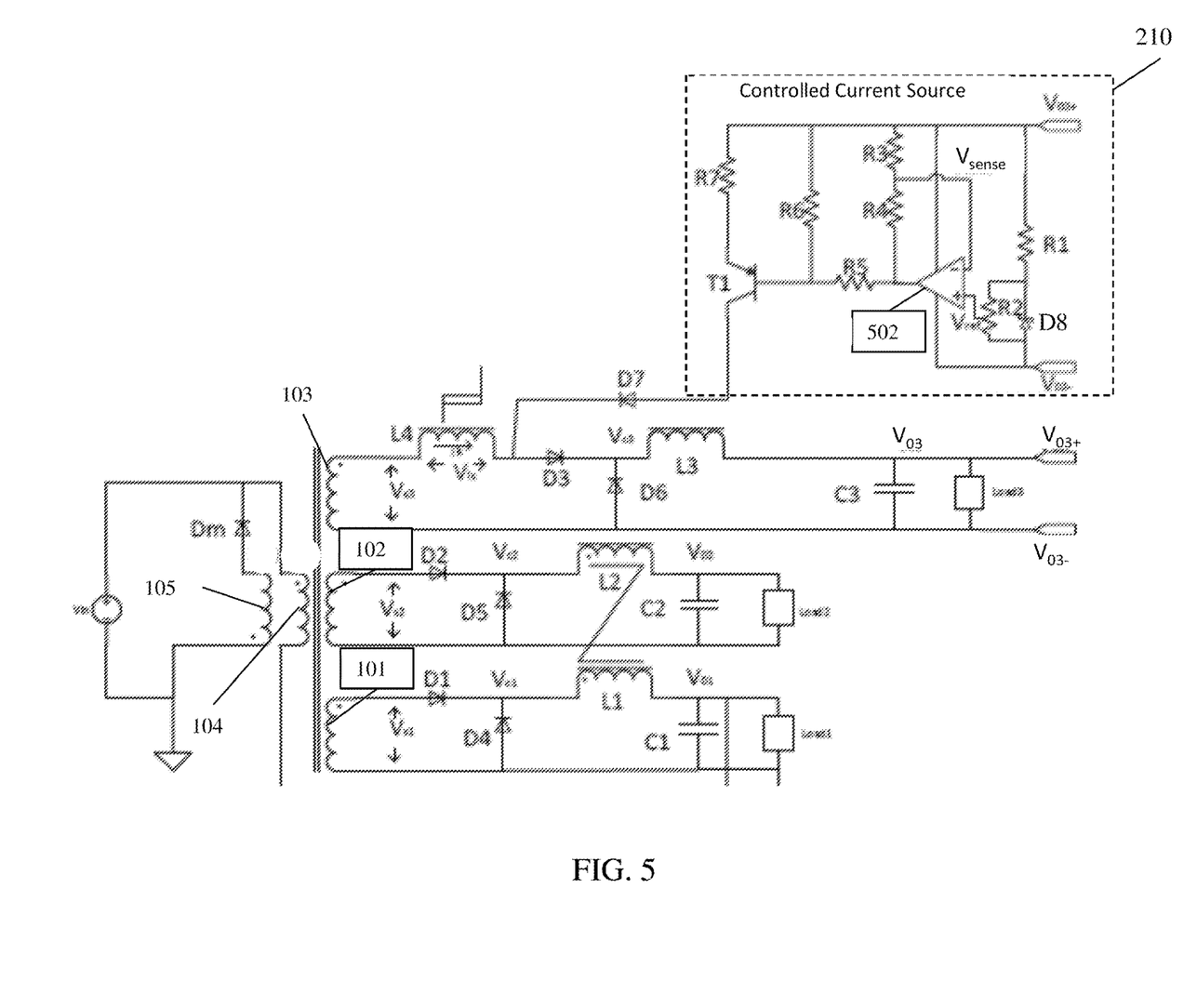
FIG. 5 depicts a circuit diagram of the controlled current source with magnetics in path according to one or more embodiments.

FIG. 5 depicts a circuit diagram of the controlled current source 210 with magnetics in path according to one or more embodiments. The controlled current source 210 includes an inverting operational amplifier 502. This op-amp 502 can be driven from the output voltage V03 so that it shall be a self-sustaining power supply. The non-inverting input end can receive a reference voltage Vref using a Zener diode D8, a potentiometer R2, and the output voltage V03. As the V03 decreases, Vsense decreases. As Vsense decreases, the output at the op-amp 502 increases which drives a larger current into the base of T1 to bring it to the cut off region, thus driving less current into the saturable inductor L4 causing lesser demagnetizing flux in the core. This results in an increased higher duty pulse of $V_{c3}$ to being $V_{O3}$ higher. The opposite effect occurs and $V_3$ decreases to bring $V_{O3}$ to a lower voltage.

In one or more embodiments, Load2 can be regulated through magnetic coupling inductor L2 with L1, where inductor L1 is included in the regulated Stage1 converter.

Define the turns of winding 101 and winding 102 as $N_{s1}$ and $N_{s2}$, respectively. The voltage ratio of winding 101 and winding 102 are proportional to their turns ratio as defined as n1 in equations (3) and (4) below.

$$\frac{V_{s2}}{V_{s1}} = \frac{N_{s2}}{N_{s1}} = n1 \quad (3)$$

$$\frac{V_{s2}}{V_{s1}} = \frac{V_{c2}+V_{D2}}{V_{c1}+V_{D1}} = \frac{N_{s2}}{N_{s1}} = n1 \quad (4)$$

$V_{D2}$ and $V_{D1}$ are the forward voltage drop cross the diode D2 and D1, respectively. Neglecting the diode drop across D2 and D1 as it is significantly smaller as compared to the voltages $V_{C2}$ and $V_{C1}$ leads to equation (5).

$$\frac{V_{s2}}{V_{s1}} = \frac{V_{c2}}{V_{c1}} = \frac{N_{s2}}{N_{s1}} = n1 \quad (5)$$

If the turns ratio is maintained as the same as n1 of L1 and L2 on the coupled core, the voltage induced across their winding shall be proportional to their turns ratios as illustrated in equations (6), (7), and (8).

$$n1 = \frac{N_{L2}}{N_{L1}} = \frac{V_{L2}}{V_{L1}} \quad (6)$$

With the following values for $V_{o2}$ and $V_{o1}$:

$$V_{o2} = V_{c2} - V_{L2} \quad (7)$$

$$V_{o1} = V_{c1} - V_{L1} \quad (8)$$

From equation (5) and (6), taking the value of $V_{c2}$ and $V_{L2}$ into equation (7), equation (9) illustrates:

$$V_{o2} = n1 V_{c1} - n1 V_{L1} \quad (9)$$

And from equation (8) putting the value of $V_{o1}$ into equation (9), equation (10) illustrates:

$$V_{o2} = n1(V_{c1} - V_{L1}) = n1 V_{o1} \quad (10)$$

Hence, if the regulated voltage of Load1 is controlled with duty cycle control, then the Load2 winding is related with the physical parameter n1 which is preset in the design of the forward converter. This will automatically control the regulation of the Load2 windings.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power system comprising:
   a transformer comprising:
   a set of primary windings comprising a first primary winding;
   a set of secondary windings comprising a first secondary winding, a second secondary winding, and a third secondary winding;
   a set of DC to DC converters comprising a first DC to DC converter coupled to the first secondary winding, a second DC to DC converter coupled to the second secondary winding, and a third DC to DC converter coupled to the third secondary winding;
   a switch configured to operate the first primary winding;
   a control circuit configured to operate the switch, wherein the control circuit operates the switch based on a first output voltage of the first DC to DC converter, wherein a first filter inductor of the first DC to DC converter is magnetically coupled to a second filter inductor of the second DC to DC converter;
   a saturable reactor coupled to a third output of the third secondary winding and an input to the third DC to DC converter, wherein the third DC to DC converter comprises a third filter inductor in series with the saturable reactor; and
   a controlled current source coupled to a node between the saturable reactor and the third inductor, wherein the controlled current source is configured to provide a current rate based on a third output voltage of the third DC to DC converter.

2. The power system of claim 1, wherein the controlled current source comprises an error amplifier circuit and a transistor.

3. The power system of claim 2, wherein the transistor comprises a PNP transistor.

4. The power system of claim 2, wherein the current rate is provided to the node for a first period of time.

5. The power system of claim 4, wherein the first period of time is determined based on an error output of the error amplifier circuit as a gate input to the transistor.

6. The power system of claim 4, wherein the current rate sets a current flow value that desaturates the saturable reactor at a proportional desaturation rate.

7. The power system of claim 1, wherein the transformer further comprises a second primary winding.

8. The power system of claim 7, wherein the second primary winding comprises a demagnetizing winding in parallel to the first primary winding.

9. The power system of claim 1, wherein the DC to DC converter comprises a buck converter.

* * * * *